United States Patent
Maunsell et al.

(10) Patent No.: US 12,332,759 B2
(45) Date of Patent: Jun. 17, 2025

(54) COMMUNICATION MECHANISM TO EXTERNALIZE INFORMATION ABOUT EMBEDDED APPLIANCES

(71) Applicant: Dell Products L.P., Round Rock, TX (US)

(72) Inventors: Caroline Maunsell, Cork (IE); Richard Cormier, Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 131 days.

(21) Appl. No.: 18/462,495

(22) Filed: Sep. 7, 2023

(65) Prior Publication Data

US 2025/0086082 A1     Mar. 13, 2025

(51) Int. Cl.
*G06F 11/30* (2006.01)
*G06F 11/32* (2006.01)

(52) U.S. Cl.
CPC ........ *G06F 11/328* (2013.01); *G06F 11/3006* (2013.01)

(58) Field of Classification Search
CPC .. G06F 11/3013; G06F 11/3034; G06F 11/30; G06F 11/3003; G06F 11/3006
USPC ....................................... 714/47.1
See application file for complete search history.

(56) References Cited

U.S. PATENT DOCUMENTS

| | | | | |
|---|---|---|---|---|
| 10,979,281 | B2 * | 4/2021 | Arora | H04L 41/0604 |
| 2014/0059538 | A1 * | 2/2014 | Bookman | G06F 11/3006 |
| | | | | 718/1 |
| 2021/0181967 | A1 * | 6/2021 | Oh | G06F 3/0653 |
| 2021/0373991 | A1 * | 12/2021 | Gallacher | G06F 11/3034 |
| 2022/0237080 | A1 * | 7/2022 | Attanasio | G06F 3/0679 |
| 2023/0267047 | A1 * | 8/2023 | Hanna | G06F 11/0793 |
| | | | | 714/23 |
| 2024/0028376 | A1 * | 1/2024 | Gupta | G06F 9/45558 |

* cited by examiner

*Primary Examiner* — Chae M Ko
(74) *Attorney, Agent, or Firm* — DALY, CROWLEY, MOFFORD & DURKEE, LLP

(57) ABSTRACT

An example methodology includes determining, by a management module instance managing an array, whether the management module instance is an array embedded management module instance. The method also includes, responsive to a determination that the management module instance is an array embedded management module instance, by the array embedded management module instance, retrieving information about an embedded appliance on the array and writing the information about the embedded appliance to a shared memory mechanism that is accessible by one or more host installed management module instances managing the array, so as to distribute the information about the embedded appliance from the embedded management module instance to the one or more host installed management module instances.

20 Claims, 5 Drawing Sheets

COMMUNICATION MECHANISM TO EXTERNALIZE INFORMATION ABOUT EMBEDDED APPLIANCES

BACKGROUND

A storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

Data storage systems and other kinds of client-server computing systems may provide system heath monitoring to allow organizations (e.g., customers) to monitor the health of the system. For example, the storage systems may provide management software that includes a system health dashboard from which customers can determine the health of the system. Using the provided dashboard, customers can monitor the health status of their storage arrays to identify where the storage array health issues are to ensure that their data is stored in a reliable manner.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes determining, by a management module instance managing an array, whether the management module instance is an array embedded management module instance. The method also includes, responsive to a determination that the management module instance is an array embedded management module instance, by the array embedded management module instance, retrieving information about an embedded appliance on the array and writing the information about the embedded appliance to a shared memory mechanism that is accessible by one or more host installed management module instances managing the array, so as to distribute the information about the embedded appliance from the embedded management module instance to the one or more host installed management module instances.

In some embodiments, the embedded appliance includes a Software Defined Network Attached Storage (SDNAS) system.

In some embodiments, the shared memory mechanism includes a shared file system. In one such embodiment, writing the information about the embedded appliance includes saving the information about the embedded appliance to a file and writing the file to the shared file system.

In some embodiments, the information about the embedded appliance includes information about health issues and alerts associated with the embedded appliance. In one such embodiment, the method also includes, by the array embedded management module instance, retrieving hardware alerts for the array and computing a health score of the array based on the hardware alerts for the array and the information about health issues and alerts associated with the embedded appliance. In one embodiment, the method further includes, by the array embedded management module instance, sending the health score of the array to a management service, so as to report the health score of the array to a customer using the array.

In some embodiments, the method also includes, responsive to a determination that the management module instance is a host installed management module instance, by the host installed management module instance, retrieving the information about the embedded appliance from the shared memory mechanism. In one such embodiment, the information about the embedded appliance includes information about health issues and alerts associated with the embedded appliance, and the method further includes, by the host installed management module instance, retrieving hardware alerts for the array and computing a health score of the array based on the hardware alerts for the array and the information about the embedded appliance. In one embodiment, the method further includes, by the host installed management module instance, sending the health score of the array to a management service, so as to report the health score of the array to a customer using the array.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process including determining, by a management module instance managing an array, whether the management module instance is an array embedded management module instance. The process also includes, responsive to a determination that the management module instance is an array embedded management module instance, by the array embedded management module instance, retrieving information about an embedded appliance on the array and writing the information about the embedded appliance to a shared memory mechanism that is accessible by one or more host installed management module instances managing the array, so as to distribute the information about the embedded appliance from the embedded management module instance to the one or more host installed management module instances.

According to another illustrative embodiment provided to illustrate the broader concepts described herein, a non-transitory machine-readable medium encodes instructions that when executed by one or more processors cause a process to be carried out, the process including determining, by a management module instance managing an array, whether the management module instance is an array embedded management module instance. The process also includes, responsive to a determination that the management module instance is an array embedded management module instance, by the array embedded management module instance, retrieving information about an embedded appliance on the array and writing the information about the embedded appliance to a shared memory mechanism that is accessible by one or more host installed management module instances managing the array, so as to distribute the information about the embedded appliance from the embedded management module instance to the one or more host installed management module instances.

In accordance with still another illustrative embodiment provided to illustrate the broader concepts, systems, and techniques described herein, a method includes determining, by a management module instance managing an array, whether the management module instance is an array embedded management module instance. The method also includes, responsive to a determination that the management module instance is an array embedded management module instance, by the array embedded management module instance, retrieving information about health issues and alerts associated with an embedded appliance on the array, retrieving hardware alerts for the array, computing a health score of the array based on the hardware alerts for the array and the information about health issues and alerts associated with the embedded appliance, and writing the information about health issues and alerts associated with an embedded appliance to a shared memory mechanism that is accessible by one or more host installed management module instances managing the array, so as to distribute the information about health issues and alerts associated with an embedded appliance from the embedded management module instance to the one or more host installed management module instances.

In some embodiments, the method also includes, responsive to a determination that the management module instance is a host installed management module instance, by the host installed management module instance, retrieving the information about health issues and alerts associated with the embedded appliance from the shared memory mechanism, retrieving hardware alerts for the array, and computing a health score of the array based on the hardware alerts for the array and the information about health issues and alerts associated with the embedded appliance.

According to yet another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process including determining, by a management module instance managing an array, whether the management module instance is an array embedded management module instance. The process also includes, responsive to a determination that the management module instance is an array embedded management module instance, by the array embedded management module instance, retrieving information about health issues and alerts associated with an embedded appliance on the array, retrieving hardware alerts for the array, computing a health score of the array based on the hardware alerts for the array and the information about health issues and alerts associated with the embedded appliance, and writing the information about health issues and alerts associated with an embedded appliance to a shared memory mechanism that is accessible by one or more host installed management module instances managing the array, so as to distribute the information about health issues and alerts associated with an embedded appliance from the embedded management module instance to the one or more host installed management module instances.

According to yet another illustrative embodiment provided to illustrate the broader concepts described herein, a non-transitory machine-readable medium encodes instructions that when executed by one or more processors cause a process to be carried out, the process including determining, by a management module instance managing an array, whether the management module instance is an array embedded management module instance. The process also includes, responsive to a determination that the management module instance is an array embedded management module instance, by the array embedded management module instance, retrieving information about health issues and alerts associated with an embedded appliance on the array, retrieving hardware alerts for the array, computing a health score of the array based on the hardware alerts for the array and the information about health issues and alerts associated with the embedded appliance, and writing the information about health issues and alerts associated with an embedded appliance to a shared memory mechanism that is accessible by one or more host installed management module instances managing the array, so as to distribute the information about health issues and alerts associated with an embedded appliance from the embedded management module instance to the one or more host installed management module instances.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
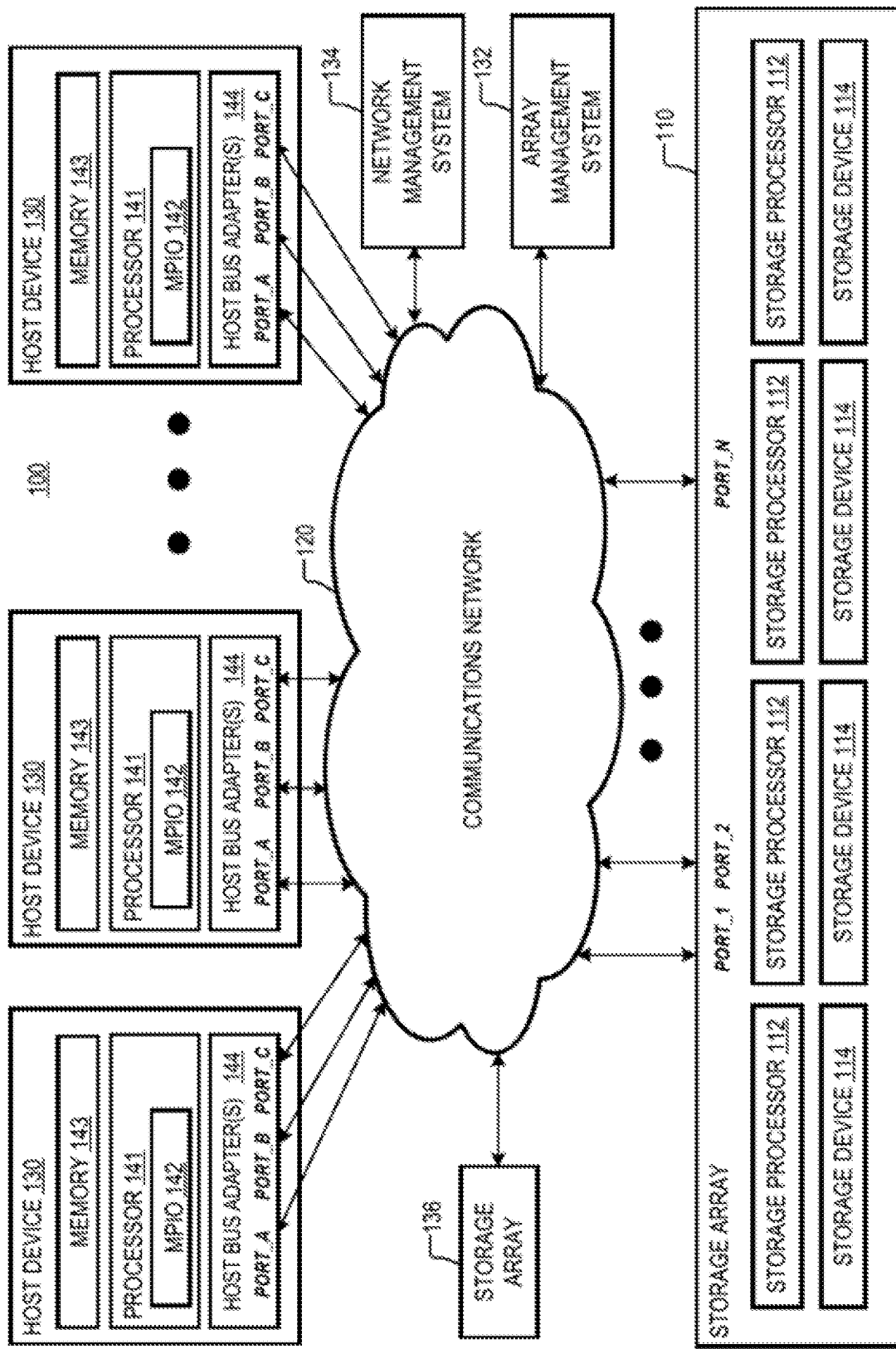
FIG. 1 is a block diagram of an illustrative storage system within which embodiments of the present disclosure may be utilized.

Management software provided by storage systems, such as DELL/EMC PowerMax™ and PowerStore™, may be configured to directly run on a storage array (sometimes referred to herein more simply as an "array") as an embedded install. Such management software is also referred to herein as "array embedded management module." The management software may also be configured to run on a host (e.g., host device) as a host-based install, for example. Such management software is also referred to herein as "host installed management module." In any case, the management module may provide access to a health score that is generated based on an analysis of various system health metrics including system health issues and alerts. Users (e.g., customers) may use the provided management module to access health scores to determine the health status of their arrays.

Storage arrays may support embedded appliances such as, for example, Software Defined Network Attached Storage (SDNAS) systems. Existing arrays may not expose the embedded appliances. In the existing arrays, embedded appliances may be completely encapsulated within the embedded environment and only be viewed and managed on the array embedded management module instance. The host installed management module instances may not have visibility of the embedded appliances since such appliances are not exposed by the arrays. As a result, the health scores for the same array may differ across management module instances (e.g., the health scores reported for the same array may differ depending on the type of management module instance that computes and reports/displays the health score). For example, the array embedded management module instance can incorporate health issues and alerts of any embedded appliances on the array in its computation of the health score since the embedded appliances are visible to the array embedded management module. In contrast, a host installed management module instance is not able to incorporate health issues and alerts of any embedded appliances on the array in its computation of the health score since the embedded appliances are not visible to the host installed management module. As a result, in cases where an array has an embedded appliance, the computation of the health score may be inconsistent across the management module instances. Further, the health scores reported to customers may differ for the same array depending on the management module instance type (e.g., array embedded management module instance or host installed management module instance) the customer is using to view the health scores. Because of the inconsistency in the reported health scores, it may be difficult for customers to use the health scores for monitoring the health status of their storage arrays to ensure their data is stored on a reliable array.

Disclosed herein are concepts, structures, and techniques for externalizing information about embedded appliances. In some embodiments, a communication path can be created to facilitate distribution of information from an array embedded management module instance managing an array to host installed management module instances managing the same array. In particular, according to some such embodiments, the communication path comprises shared memory mechanism that is accessible by the management module instances and which can be utilized to distribute information, such as information about an embedded appliance, to the host installed management module instances. For example, an array embedded management module instance managing an array can retrieve appliance health issues and alerts associated with an embedded appliance on the array (e.g., SDNAS health issues and alerts for the array) and write information about the embedded appliance health issues and alerts to the shared memory mechanism for retrieval by all the host installed management module instances managing the same array. Distributing the health issues and alerts of embedded appliances in this way enables the management module instances managing the same array to compute consistent health scores that accurately reflect the health of the array. Numerous configurations and variations will be apparent in light of this disclosure.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 500 of FIG. 5. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 5:
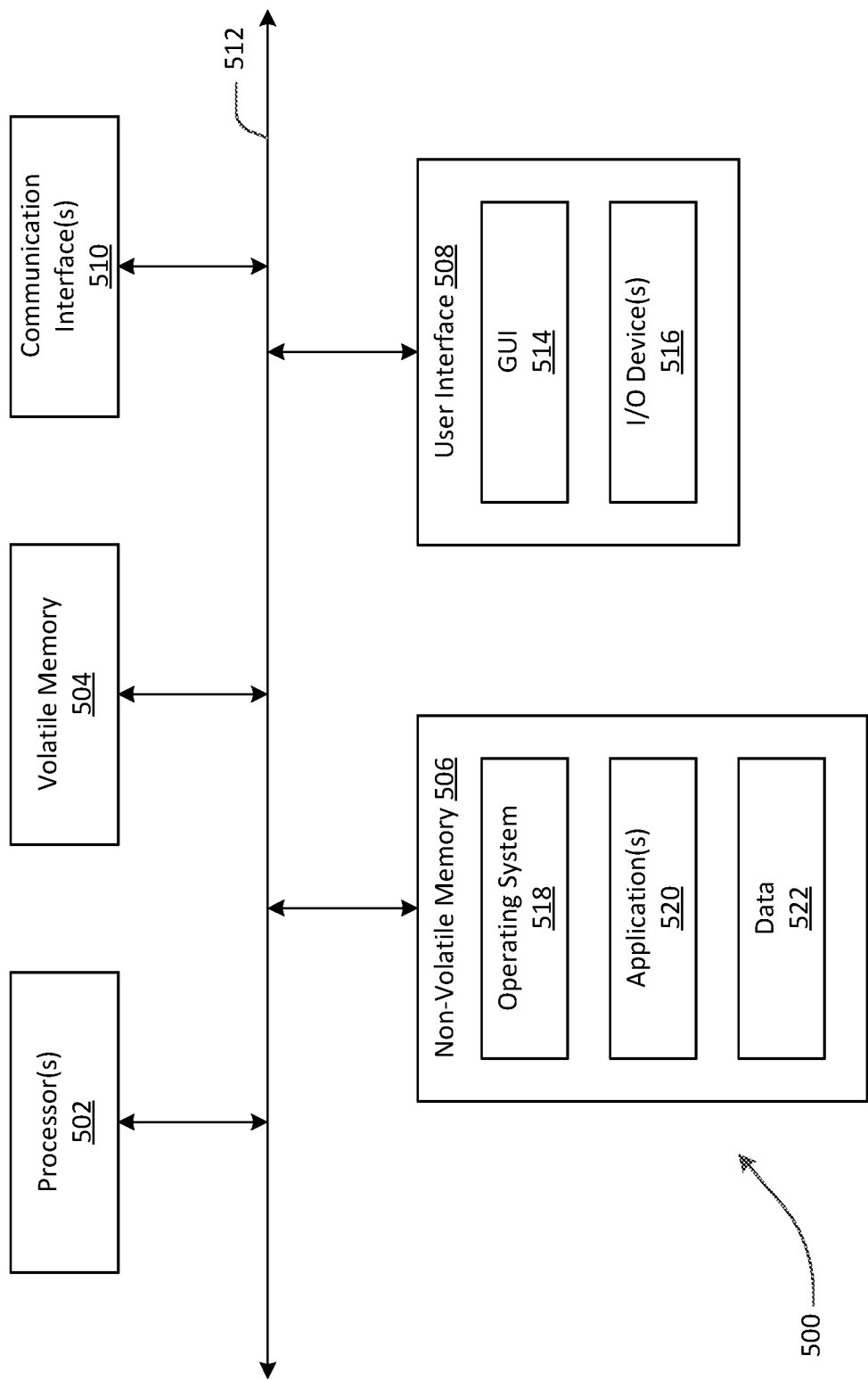
FIG. 5 is a block diagram illustrating selective components of an example computing device in which various aspects of the disclosure may be implemented, in accordance with an embodiment of the present disclosure.

Array management system 132 may include a computing device, such as computing device 500 of FIG. 5. Array management system 132 may be used by a system administrator to re-configure storage array 110, e.g., when degraded performance of storage array 110 is detected.

Network management system 134 may include a computing device, such as computing device 500 of FIG. 5. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
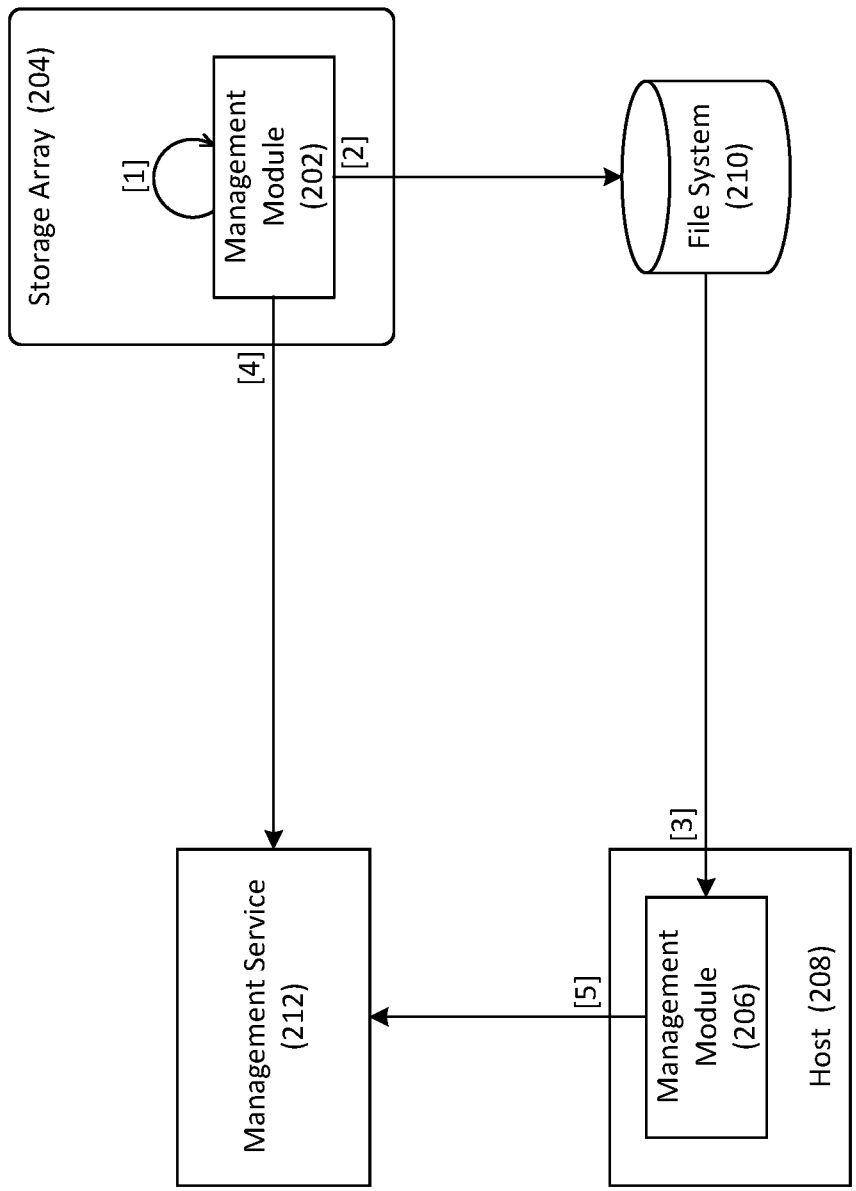
FIG. 2 is a schematic illustration of an example information distribution topology that can be used to externalize information about embedded appliances, in accordance with an embodiment of the present disclosure.

FIG. 2 is a schematic illustration of an example information distribution topology that can be used to externalize information about embedded appliances, in accordance with an embodiment of the present disclosure. Such a topology can be understood as an iterative process in which a management module 202 on a storage array 204 (sometimes referred to herein more simply as "array 204") and a management module 206 on a host 208 leverage the services/functionality provided by a file system 210 to externalize information about an embedded appliance(s) on storage array 204. In the example of FIG. 2, management module 202 is an array embedded management module instance (i.e., array embedded management module instance 202) running directly on array 204 and management module 206 is a host installed management module instance (i.e., host installed management module instance 206) running on host 208. For purposes of this discussion, it is also assumed that array embedded management module instance 202 and host installed management module instance 206 are operable to manage array 204 (i.e., management module instances 202, 206 are operable to manage the same array 204).

In the example of FIG. 2, as part of its management services, array embedded management module instance 202 may collect or otherwise retrieve [1] information about an embedded appliance on array 204. For example, the embedded appliance may be completely encapsulated within the environment of array 204 and not exposed outside of array 204. The information may include information about the embedded appliance that can only be viewed and managed by array embedded management module instance 202. The information about the embedded appliance may include information about the health of the embedded appliance, such as, for example, information about any health issues and alerts associated with the embedded appliance. Such information about health issues and alerts associated with the embedded appliance is also referred to herein as "embedded appliance alerts." Once array embedded management module instance 202 collects the information about the embedded appliance, array embedded management module instance 202 may write [2] some or all of the collected information to file system 210, which is accessible by host installed management module instance 206. Writing to file system 210 that is accessible by host installed management module instance 206 enables array embedded management module instance 202 to leverage file system 210 as a shared memory mechanism to distribute the information about the embedded appliance on array 204 to host installed management module instance 206 as well as other processes (or "instances"), such as application processes, which are outside array 204 but have access to file system 210.

In some embodiments, array embedded management module instance 202 may compute a health score of array 204. The computed health score of array 204 may be reflective of or represent the health of array 204. The health score may be computed based on an evaluation of information about the health of array 204 and the health of embedded appliance(s) on array 204, including an analysis of information about any system health issues and alerts associated with array 204 and embedded appliance(s) on array 204. For example, according to one embodiment, array embedded management module instance 202 can retrieve information about any system health issues and alerts (e.g., hardware alerts) associated with array 204 from array 204 or a log of array 204. Array embedded management module instance 202 can then compute a health score of array 204 based on analysis of any system health issues and alerts associated with array 204 and the collected information about embedded appliances(s) on array 204 (e.g., based on an analysis of the hardware alerts for array 204 and the embedded appliance alerts for the embedded appliance(s) on array 204). As a result, the health score computed by array embedded management module instance 202 incorporates both health issues and alerts of array 204 and health issues and alerts of any embedded appliance on array 204.

Continuing the example of FIG. 2, as part of its management services, host installed management module instance 206 may retrieve [3] the information about the embedded appliance on array 204 from file system 210. As mentioned previously, the information about the embedded appliance may include embedded appliance alerts. As a result, the information about the embedded appliance on array 204, including any embedded appliance alerts, is externalized outside of the environment of array 204.

In some embodiments, host installed management module instance 206 may compute a health score of array 204. Similar to the health score generated by array embedded management module instance 202, the health score of array 204 generated by host installed management module instance 206 may be reflective of or represent the health of array 204. The health score may be computed based on an evaluation of information about the health of array 204 and the health of embedded appliance(s) on array 204, including an analysis of information about any system health issues and alerts associated with array 204 and embedded appliance(s) on array 204. For example, according to one embodiment, host installed management module instance 206 can retrieve information about any system health issues and alerts (e.g., hardware alerts) associated with array 204 from array 204 or a component of array 204, such as, for example, an alerts service configured to manage issues and alerts of array 204. Host installed management module instance 206 can then compute a health score of array 204 based on analysis of any system health issues and alerts associated with array 204 and the information about embedded appliances(s) on array 204 retrieved from file system 210 (e.g., based on an analysis of the hardware alerts for array 204 and the embedded appliance alerts for the embedded appliance(s) on array 204 retrieved from file system 210). As a result, the health score computed by host installed management module instance 206 incorporates both health issues and alerts of array 204 and health issues and alerts of any embedded appliance on array 204. Note that information about the health issues and alerts of any embedded appliance on array 204 is externalized to host installed management module instance 206 by array embedded management module instance 202. As a result, host installed management module instance 206 and array embedded management module instance 202 can compute consistent health scores of array 204.

In some embodiments, upon computing a health score of array 204, array embedded management module instance 202 may send or otherwise provide [4] the information about the computed health score (e.g., health score, etc.) to a management service 212. For example, management service 212 may be a cloud-based application that provides management of array 204 as well as other systems and services. Similarly, upon computing a health score of array 204, in some embodiments, host installed management module instance 206 may also send or otherwise provide [5] the information about the computed health score of array 204 to management service 212. In any case, the information about an embedded appliance on array 204 can be further externalized in the form of a health score of array 204 via management service 212.

In some embodiments, management service 212 may apply a ranking technique to rank information provided by array embedded management module instance 202 and host installed management module instance 206. By way of an example, in cases where array embedded management module instance 202 and host installed management module instance 206 provide information concerning the same object (e.g., information about a health score of array 204), management service 212 can apply a ranking technique that gives preference to the information provided by array embedded management module instance 202 over the information provided by host installed management module instance 206. This enables management service 212 to ensure that the information (e.g., the information about the health score of array 204) from array embedded management module instance 202 and host installed management module instance 206 that is provided via management service 212 to be consistent.

Figure 3:
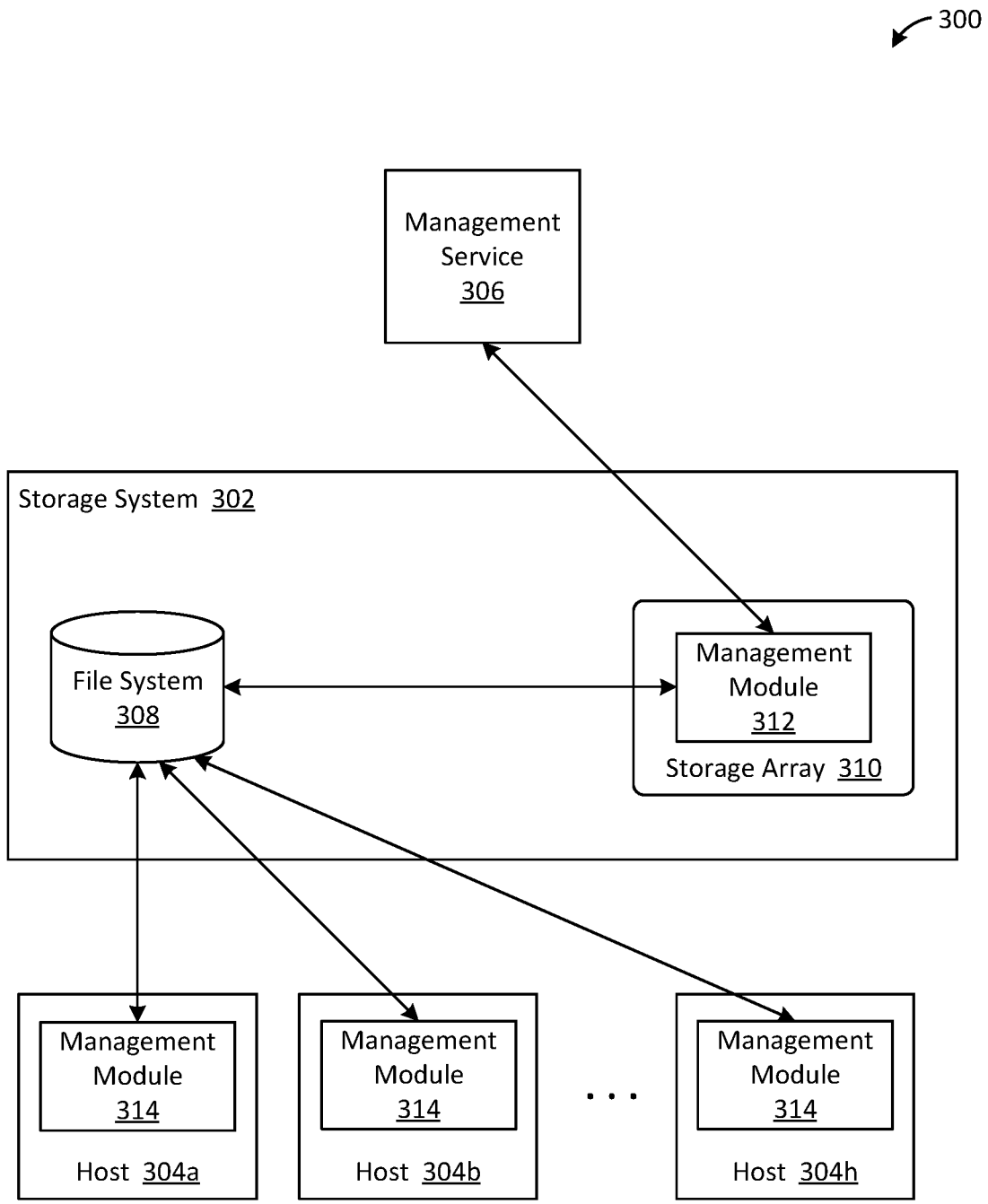
FIG. 3 is a block diagram of an illustrative system for externalizing information about embedded appliances, in accordance with an embodiment of the present disclosure.

Referring now to FIG. 3, shown is a block diagram of an illustrative system 300 for externalizing information about embedded appliances, in accordance with an embodiment of the present disclosure. Illustrative system 300 includes a storage system 302 one or more hosts 304*a*, 304*b*, . . . , 304*h* (304 generally), and a management service 306. Storage system 302, hosts 304, and management service 306 may be communicably coupled to one another via one or more communication networks (not shown). The communication networks can include, for example, the Internet, LANs, WANs, FC networks, etc. Storage system 302 can be the same or similar to storage system 100 of FIG. 1.

As shown in FIG. 3, storage system 302 includes a file system 308 and a storage array 310 that, in turn, includes a management module 312. File system 308 of FIG. 3 may correspond to file system 210 of FIG. 2, storage array 310 of FIG. 3 may correspond to storage array 204 of FIG. 2 and/or storage array 110 of FIG. 1, and management module 312 of FIG. 3 may correspond to management module 202 of FIG. 2. To promote clarity in the drawings, FIG. 3 shows a single storage array (e.g., storage array 310) in storage system 302. However, it will be appreciated that there may be a different number of storage arrays, such as two or four or more, in storage system 302.

Referring to storage array 310, management module 312 is generally operable to provide management of storage array 310. Management module 312 may perform tasks such as monitoring the status of storage array 310, monitoring the health of storage array 310, initiating updates/upgrades of storage array 310, migrating workloads for load balancing, and many other management tasks. Management module 312 may provide a user interface (e.g., a graphical user interface (GUI) and/or a command line interface) for accessing intuitive task-based navigation and controls, customizable dashboards and reports, and other management information. As previously described, management module 312 executing on storage array 310 may be an array embedded management module instance.

Management module 312 may generate and provide a health score that represents a health status of storage array 310. The health score of storage array 310 incorporates both information about the health of storage array 310 as well as information about the health of embedded appliance(s) on storage array 310. Note that management module 312 is able to incorporate information about the embedded appliances which are completely encapsulated within and not exposed by storage array 310 since management module 312 is an array embedded instance (i.e., management module 312 directly runs on storage array 310) and has visibility of the appliances embedded on storage array 310. In more detail, management module 312 can retrieve information about any system health issues and alerts (e.g., hardware alerts) associated with storage array 310. For example, management module 312 can retrieve such information from storage array 310 or a log of storage array 310. Management module 312 can also determine whether there are any embedded appliances on storage array 310. As noted above, management module 312 can determine whether there are any embedded appliances on storage array 310 since management module 312 is an array embedded instance and has visibility of appliances embedded on storage array 310. For example, for a particular embedded appliance, management module 312 can access storage array 310 and/or a storage array 310 log and retrieve the embedded appliance alerts for the embedded appliance (i.e., embedded appliance alerts associated with the embedded appliance). The embedded appliance alerts may include information about issues (e.g., health issues) and alerts (e.g., error alerts generated to help identify the issues) associated with an embedded appliance.

Upon retrieving the embedded appliance alerts associated with the embedded appliances on storage array 310, management module 312 can store (e.g., record) information about the embedded appliance alerts within a shared memory mechanism that is accessible by processes (or "instances") outside storage array 310. For example, management module 312 can write some or all the information about the embedded appliance alerts to file system 308, which is accessible by processes outside storage array 310. In more detail, management module 312 can save the information about the embedded appliance alerts in a file and write the file to file system 308. In addition to the saved information about the embedded appliance alerts, the file may include metadata that indicates the particular embedded appliance to which the embedded appliance alerts pertain to as well as the particular storage array on which the appliance is embedded. This metadata can be subsequently used to determine whether any embedded appliances are on a storage array as well as identify the information about the embedded appliance alerts for a particular embedded appliance, or information about group(s) of embedded appliance alerts in the case of multiple embedded appliances on the same array.

Management module 312 can generate the health score of storage array 310 based on an evaluation of information about the health of storage array 310 and the health of embedded appliance(s) on storage array 310. That is, management module 312 can compute the health score of storage array 310 from information about the health of storage array 310 and information about embedded appliance alerts for any embedded appliances on storage array 310. In some embodiments, management module 312 can store (e.g., record) the computed health score of storage array 310 within a data store, where it can subsequently be retrieved and used. In some embodiments, management module 312 can send or otherwise provide information about the health score of storage array 310 to management service 306, which may be the same as or similar to management service 212 of FIG. 2.

In some embodiments, management module 312 can provide a health score of storage array 310 on a continuous or periodic basis (e.g., according to a predetermined schedule). For example, management module 312 can generate a health score of storage array 310 according to a predetermined schedule, such as, for example, every N (e.g., N=5) minutes. The schedule can be configured by an organization, such as a company, corporation, or other type of entity, that is providing storage system 302, for example. The schedule may be specified as part of an organizational policy. As a result, management module 312 externalizes the information about the embedded appliances on storage array 310 on the same continuous or periodic basis (e.g., every N minutes) by writing the information about the embedded appliance to file system 308.

Referring to hosts 304, the individual hosts 304 may include a management module 314. Management module 314 of FIG. 3 may correspond to management module 206 of FIG. 2. In the example of FIG. 3, each management module 314 is a host installed management module instance running on a respective host 304 and is generally operable to provide management of storage array 310. Similar to management module 312 discussed above, management module 314 may perform tasks such as monitoring the status of storage array 310, monitoring the health of storage array 310, initiating updates/upgrades of storage array 310, migrating workloads for load balancing, and many other management tasks. Management module 314 may provide a user interface (e.g., a GUI and/or a command line interface) for accessing intuitive task-based navigation and controls, customizable dashboards and reports, and other management information.

Management module 314 may generate and provide a health score that represents the health status of storage array 310. The health score of storage array 310 incorporates both information about the health of storage array 310 as well as information about the health of embedded appliance(s) on storage array 310. In more detail, management module 314 can retrieve information about embedded appliance alerts for any embedded appliances on storage array 310 from file system 308. For example, management module 314 can determine whether there are any files related to storage array 310 and embedded appliances on storage array 310 in file system 308. Such determination may be made using the metadata associated with the files in file system 308. If there are files related to embedded appliances on storage array 310, management module 314 can read from the files the information about the embedded appliance alerts (e.g., read the files that contain the information about embedded appliances on storage array 310). Management module 314 can retrieve information about any system health issues and alerts (e.g., hardware alerts) associated with storage array 310 from storage array 310 or a component of storage array 310 (e.g., an alerts service associated with storage array 310). Management module 314 can then generate the health score of storage array 310 based on the an evaluation of information about the health of storage array 310 and the health of embedded appliance(s) on storage array 310. That is, management module 312 can compute the health score of storage array 310 from information about the health of storage array 310 and information about embedded appliance alerts for any embedded appliances on storage array 310 retrieved from file system 308. In some embodiments, management module 314 can store (e.g., record) the computed health score of storage array 310 within a data store, where it can subsequently be retrieved and used. In some embodiments, management module 314 can send or otherwise provide information about the health score of storage array 310 to management service 306, which may be the same as or similar to management service 212 of FIG. 2.

In some embodiments, management module 314 can provide a health score of storage array 310 on a continuous or periodic basis (e.g., according to a predetermined schedule). For example, management module 314 can generate a health score of storage array 310 according to a predetermined schedule, such as, for example, every M (e.g., M=5) minutes. The schedule can be configured by an organization, such as a company, corporation, or other type of entity, that is providing storage system 302, for example. The schedule may be specified as part of an organizational policy.

Figure 4:
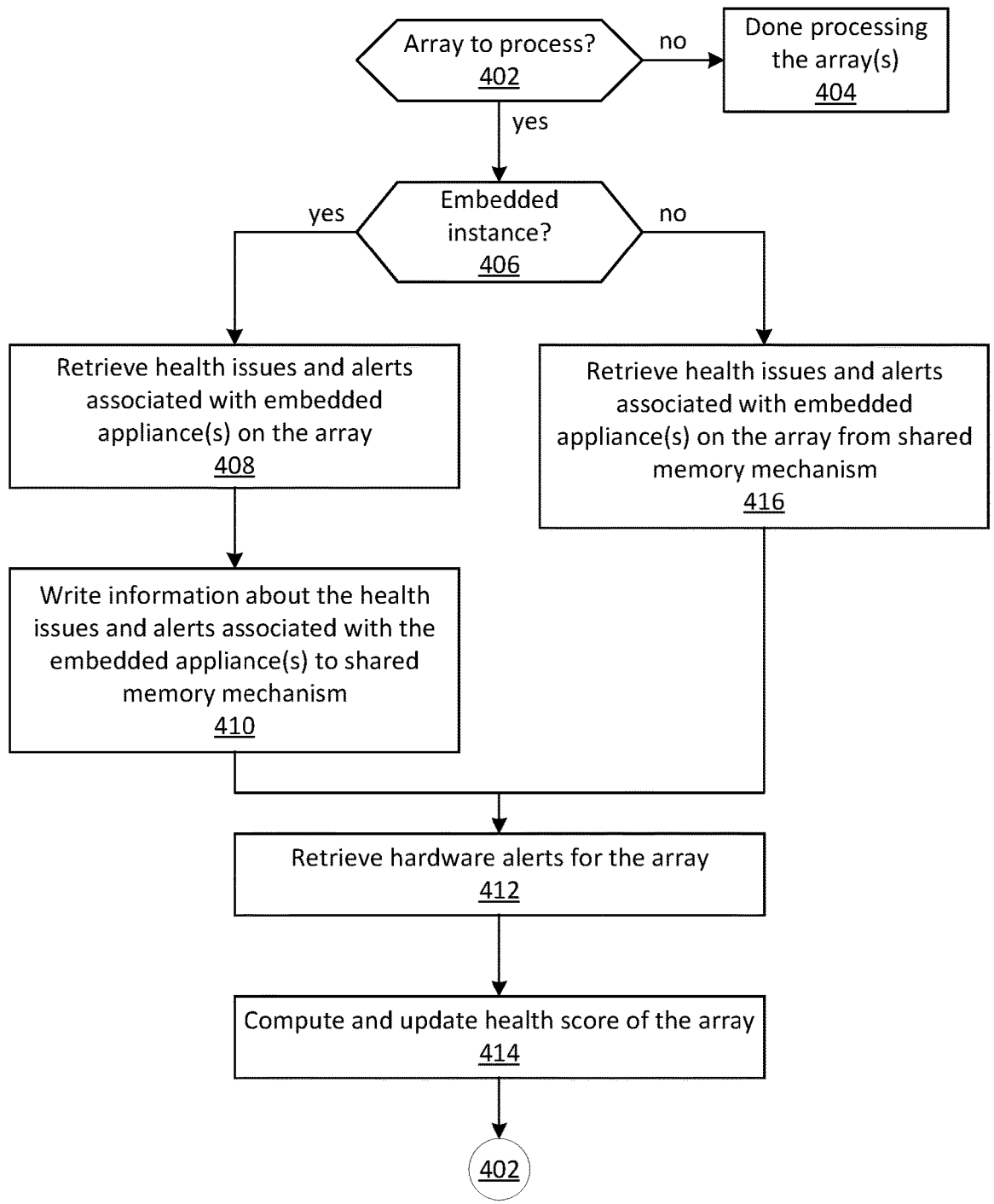
FIG. 4 is a flow diagram of an example process for externalizing information about embedded appliances, in accordance with an embodiment of the present disclosure.

FIG. 4 is a flow diagram of an example process 400 for externalizing information about embedded appliances, in accordance with an embodiment of the present disclosure. Illustrative process 400 may be implemented, for example, within management module 312 and/or management module 314 of FIG. 3.

With reference to process 400 of FIG. 4, at 402, a check may be performed to determine whether there are any storage arrays that need to be processed. For the purposes of this discussion, it is assumed that a management module instance (e.g., management module 312 or management module 314 of FIG. 3) is providing management of one or more storage arrays (e.g., storage array 310 of FIG. 3). In more detail, the management module may check to determine whether a health score needs to be generated and provided for a storage array.

If, at 402, it is determined that no storage array needs to be processed, then, at 404, the management module instance may determine that all storage arrays that are being managed have been processed. In this case, in one embodiment, the management module instance can wait until the next scheduled processing of the storage arrays.

Otherwise, if, at 402, it is determined that a storage array needs to be processed, then, at 406, a check may be performed to determine whether the management module instance is an array embedded instance or a host installed instance. Here, the management module instance can check to determine whether it is an array embedded instance (i.e., whether it is directly running on the storage array) or a host installed instance (i.e., whether it is running on a host). For example, the management module instance may be an array embedded management module instance, such as management module 312 of FIG. 3, which has visibility of embedded appliances on the storage array. Alternatively, the management module instance may be a host installed management module instance, such as management module 314 of FIG. 3, which does not have visibility of embedded appliances on the storage array.

If, at 406, it is determined that the management module instance is an array embedded instance, then, at 408, health issues and alerts associated with embedded appliance(s) on the storage array may be retrieved. In more detail, the array embedded management module instance can determine whether there are any embedded appliances on the storage array. Not that there may or may not be any embedded appliances on the storage array. For each embedded appliance on the storage array, the array embedded management module instance can retrieve the health issues and alerts associated with the embedded appliance. That is, for a particular embedded appliance determined to be on the storage array, the array embedded management module instance can retrieve the embedded appliance alerts for the embedded appliance.

At 410, information about the health issues and alerts associated with the embedded appliance(s) may be written to a shared memory mechanism. The shared memory mechanism may be a file system, such as, for example, file system 308 of FIG. 3, that is accessible by processes outside the storage array. For example, the array embedded management module instance can save the information about the embedded appliance alerts for the embedded appliances in a file and write the file to the file system, where it can subsequently be retrieved and used. For example, a process running outside the storage array may retrieve the information from the file system and use the information in computing a health score of the storage system. The information about the embedded appliance alerts for an embedded appliance is indicative of the health of the embedded appliance.

At 412, hardware alerts for the storage array may be retrieved. For example, the array embedded management module instance can retrieve information about any hardware alerts associated with the storage array from the storage array or a log of the storage array. The retrieved information is indicative of the health of the storage array.

At 414, a health score of the storage array may be computed and updated. For example, the array embedded management module instance can compute the health score from information about the health of the storage array (e.g., hardware alerts) and information about embedded appliance alerts for any embedded appliances on the storage array. As such, the computed health score incorporates both the health of the storage array and the health of any embedded appliance on the storage array. The previously generated health score(s) of the storage array may then be updated with the recently computed health score of the storage array. In some embodiments, the array embedded management module instance may send information about the computed health score to a management service (e.g., management service 306 of FIG. 3).

Upon computing and updating the health score of the storage array, a check may be performed to determine whether there is another storage array that needs to be processed at 402. For example, the array embedded management module instance may check to determine whether a health score needs to be generated and provided for another storage array.

Otherwise, if, at 406, it is determined that the management module instance is not an array embedded instance, then, at 416, information about the health issues and alerts associated with the embedded appliance(s) may be retrieved from the shared memory mechanism. For example, the host installed management module instance can retrieve information about embedded appliance alerts for any embedded appliances on the storage array from the file system to which the array embedded management module instance wrote such information at 410 discussed above. As noted above, retrieved information about the embedded appliance alerts for an embedded appliance is indicative of the health of the embedded appliance.

Upon retrieving information about embedded appliance alerts for any embedded appliances on the storage array at 416, hardware alerts for the storage array may be retrieved at 412. For example, the host installed management module instance can retrieve information about any hardware alerts associated with the storage array from the storage array or a log of the storage array. The retrieved information about any hardware alerts is indicative of the health of the storage array.

At 414, a health score of the storage array may be computed and updated. For example, the host installed management module instance can compute the health score from information about the health of the storage array (e.g., hardware alerts) and information about embedded appliance alerts for any embedded appliances on the storage array. As such, the computed health score incorporates both the health of the storage array and the health of any embedded appliance on the storage array. The previously generated health score(s) of the storage array may then be updated with the recently computed health score of the storage array. In some embodiments, the host installed management module instance may send information about the computed health score to a management service (e.g., management service 306 of FIG. 3).

Upon computing and updating the health score of the storage array, a check may be performed to determine whether there is another storage array that needs to be processed at 402. For example, the host installed management module instance may check to determine whether a health score needs to be generated and provided for another storage array.

FIG. 5 is a block diagram illustrating selective components of an example computing device 500 in which various aspects of the disclosure may be implemented, in accordance with an embodiment of the present disclosure. For example, illustrative computing device 500 can perform all or part of the processes described herein. As shown, computing device 500 includes one or more processors 502, a volatile memory 504 (e.g., random access memory (RAM)), a non-volatile memory 506, a user interface (UI) 508, one or more communications interfaces 510, and a communications bus 512.

Non-volatile memory 506 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 508 may include a graphical user interface (GUI) 514 (e.g., a touchscreen, a display, etc.) and one or more input/output (I/O) devices 516 (e.g., a mouse, a keyboard, a microphone, one or more speakers, one or more cameras, one or more biometric scanners, one or more environmental sensors, and one or more accelerometers, etc.).

Non-volatile memory 506 stores an operating system 518, one or more applications 520, and data 522 such that, for example, computer instructions of operating system 518 and/or applications 520 are executed by processor(s) 502 out of volatile memory 504. In one example, computer instructions of operating system 518 and/or applications 520 are executed by processor(s) 502 out of volatile memory 504 to perform all or part of the processes described herein (e.g., processes illustrated and described with reference to FIGS. 1 through 4). In some embodiments, volatile memory 504 may include one or more types of RAM and/or a cache memory that may offer a faster response time than a main memory. Data may be entered using an input device of GUI 514 or received from I/O device(s) 516. Various elements of computing device 500 may communicate via communications bus 512.

The illustrated computing device 500 is shown merely as an illustrative client device or server and may be implemented by any computing or processing environment with any type of machine or set of machines that may have suitable hardware and/or software capable of operating as described herein.

Processor(s) 502 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 502 may be analog, digital, or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 510 may include one or more interfaces to enable computing device 500 to access a computer network such as a Local Area Network (LAN), a Wide Area Network (WAN), a Personal Area Network (PAN), or the Internet through a variety of wired and/or wireless connections, including cellular connections.

In described embodiments, computing device 500 may execute an application on behalf of a user of a client device. For example, computing device 500 may execute one or more virtual machines managed by a hypervisor. Each virtual machine may provide an execution session within which applications execute on behalf of a user or a client device, such as a hosted desktop session. Computing device 500 may also execute a terminal services session to provide a hosted desktop environment. Computing device 500 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   determining, by a management module instance managing an array, whether the management module instance is an array embedded management module instance; and
   responsive to a determination that the management module instance is an array embedded management module instance, by the array embedded management module instance:
      retrieving information about an embedded appliance on the array; and
      writing the information about the embedded appliance to a shared memory mechanism that is accessible by one or more host installed management module instances managing the array, so as to distribute the information about the embedded appliance from the embedded management module instance to the one or more host installed management module instances.

2. The method of claim 1, wherein the embedded appliance includes a Software Defined Network Attached Storage (SDNAS) system.

3. The method of claim 1, wherein the shared memory mechanism includes a shared file system.

4. The method of claim 3, wherein writing the information about the embedded appliance includes saving the information about the embedded appliance to a file and writing the file to the shared file system.

5. The method of claim 1, wherein the information about the embedded appliance includes information about health issues and alerts associated with the embedded appliance.

6. The method of claim 5, further comprising, by the array embedded management module instance:
   retrieving hardware alerts for the array; and
   computing a health score of the array based on the hardware alerts for the array and the information about health issues and alerts associated with the embedded appliance.

7. The method of claim 6, further comprising, by the array embedded management module instance, sending the health score of the array to a management service, so as to report the health score of the array to a customer using the array.

8. The method of claim 1, further comprising, responsive to a determination that the management module instance is a host installed management module instance, by the host installed management module instance, retrieving the information about the embedded appliance from the shared memory mechanism.

9. The method of claim 8, wherein the information about the embedded appliance includes information about health issues and alerts associated with the embedded appliance, the method further comprising, by the host installed management module instance:
   retrieving hardware alerts for the array; and
   computing a health score of the array based on the hardware alerts for the array and the information about the embedded appliance.

10. The method of claim 9, further comprising, by the host installed management module instance, sending the health score of the array to a management service, so as to report the health score of the array to a customer using the array.

11. A system comprising:
   one or more non-transitory machine-readable mediums configured to store instructions; and
   one or more processors configured to execute the instructions stored on the one or more non-transitory machine-readable mediums, wherein execution of the instructions causes the one or more processors to carry out a process comprising:
      determining, by a management module instance managing an array, whether the management module instance is an array embedded management module instance; and
      responsive to a determination that the management module instance is an array embedded management module instance, by the array embedded management module instance:
         retrieving information about an embedded appliance on the array; and
         writing the information about the embedded appliance to a shared memory mechanism that is accessible by one or more host installed management module instances managing the array, so as to distribute the information about the embedded appliance from the embedded management module instance to the one or more host installed management module instances.

12. The system of claim 11, wherein the embedded appliance includes a Software Defined Network Attached Storage (SDNAS) system.

13. The system of claim 11, wherein the shared memory mechanism includes a shared file system, and wherein writing the information about the embedded appliance includes saving the information about the embedded appliance to a file and writing the file to the shared file system.

14. The system of claim 11, wherein the information about the embedded appliance includes information about health issues and alerts associated with the embedded appliance.

15. The system of claim 14, wherein the process further comprises, by the array embedded management module instance:
retrieving hardware alerts for the array; and
computing a health score of the array based on the hardware alerts for the array and the information about health issues and alerts associated with the embedded appliance.

16. The system of claim 11, wherein the process further comprises, responsive to a determination that the management module instance is a host installed management module instance, by the host installed management module instance, retrieving the information about the embedded appliance from the shared memory mechanism.

17. The system of claim 16, wherein the information about the embedded appliance includes information about health issues and alerts associated with the embedded appliance, wherein the process further comprises, by the host installed management module instance:
retrieving hardware alerts for the array; and
computing a health score of the array based on the hardware alerts for the array and the information about the embedded appliance.

18. A method comprising:
determining, by a management module instance managing an array, whether the management module instance is an array embedded management module instance; and
responsive to a determination that the management module instance is an array embedded management module instance, by the array embedded management module instance:
retrieving information about health issues and alerts associated with an embedded appliance on the array;
retrieving hardware alerts for the array;
computing a health score of the array based on the hardware alerts for the array and the information about health issues and alerts associated with the embedded appliance; and
writing the information about health issues and alerts associated with an embedded appliance to a shared memory mechanism that is accessible by one or more host installed management module instances managing the array, so as to distribute the information about health issues and alerts associated with an embedded appliance from the embedded management module instance to the one or more host installed management module instances.

19. The method of claim 18, wherein the embedded appliance includes a Software Defined Network Attached Storage (SDNAS) system.

20. The method of claim 19, further comprising:
responsive to a determination that the management module instance is a host installed management module instance, by the host installed management module instance:
retrieving the information about health issues and alerts associated with the embedded appliance from the shared memory mechanism;
retrieving hardware alerts for the array; and
computing a health score of the array based on the hardware alerts for the array and the information about health issues and alerts associated with the embedded appliance.

* * * * *